(12) United States Patent
Muralidhar et al.

(10) Patent No.: US 8,775,836 B2
(45) Date of Patent: Jul. 8, 2014

(54) METHOD, APPARATUS AND SYSTEM TO SAVE PROCESSOR STATE FOR EFFICIENT TRANSITION BETWEEN PROCESSOR POWER STATES

(75) Inventors: Rajeev D. Muralidhar, Bangalore (IN); Harinarayanan Seshadri, Karnataka (IN); Bruce L. Fleming, Morgan Hill, CA (US); Vishwesh M. Rudramuni, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 561 days.

(21) Appl. No.: 13/075,057

(22) Filed: Mar. 29, 2011

(65) Prior Publication Data
US 2012/0166779 A1    Jun. 28, 2012

(30) Foreign Application Priority Data
Dec. 23, 2010   (IN) .......................... 3082/DEL/2010

(51) Int. Cl.
*G06F 1/32*  (2006.01)

(52) U.S. Cl.
USPC ........................... 713/320; 713/323; 718/108

(58) Field of Classification Search
USPC ........................... 713/300–324; 718/107, 108
See application file for complete search history.

(56) References Cited

U.S. PATENT DOCUMENTS

| | | | |
|---|---|---|---|
| 6,260,150 B1 * | 7/2001 | Diepstraten et al. .......... | 713/323 |
| 7,313,797 B2 | 12/2007 | Sundaram et al. | |
| 2006/0212727 A1 | 9/2006 | Judge et al. | |
| 2008/0201716 A1 * | 8/2008 | Du et al. ...................... | 718/104 |
| 2009/0089562 A1 | 4/2009 | Schuchman et al. | |
| 2009/0144519 A1 * | 6/2009 | Codrescu et al. ............. | 711/207 |
| 2009/0307708 A1 * | 12/2009 | Archer et al. ................. | 718/108 |
| 2010/0146513 A1 * | 6/2010 | Song ............................ | 718/104 |

OTHER PUBLICATIONS

International Search Report and Written Opinion of the International Searching Authority for Application No. PCT/US2011/063485, (Jun. 28, 2012), Whole Document.
Mudigonda, J, et al., "Using Asymmetric Single-ISA CMPs to Save Energy on Operating Systems, IEEE Mrcro Magazine, IEEE Computer Society, vol. 28, No. 3,", (May-Jun. 2008), pp. 26-41.
Shimpi, Anand L., "OS Driven Power Management, Intel Unveils Moorestown and the Atom Z600, The Fastest Smartphone Platform?, AnandTech, http://www.anandtech.com/show/3696/intel-unveils-moorestown-and-the-atom-z600-series-the-fastest-smartphone-processor/11, May 4, 2010", Whole Document.
Shimpi, Anand L., "Power Gating, Intel Unveils Moorestown and the Atom Z600, The Fastest Smartphone Platform?, http://www.anandtech.com/show/3696/intel-unveils-moorestown-and-the-atom-z600-series-the-fastest-smartphone-processor/10, AnandTech, May 4, 2010", Whole Document.
"International Preliminary Report on Patentability (Chapter I of the Patent Cooperation Treaty) for International Application No. PCT/US2011/063485", (Jul. 4, 2013), Whole Document.

* cited by examiner

*Primary Examiner* — Dennis M Butler
(74) *Attorney, Agent, or Firm* — Blakely, Sokoloff, Taylor & Zafman LLP

(57) ABSTRACT

Techniques to provide processor state for implementing a power state transition of a processor. In an embodiment, an operating system executing on a processor detects an opportunity to transition the processor to an idle processor power state. In particular embodiments, the operating system initiates the transition by invoking a task switch, wherein information describing a state of the processor is saved to a task switch segment.

26 Claims, 4 Drawing Sheets

METHOD, APPARATUS AND SYSTEM TO SAVE PROCESSOR STATE FOR EFFICIENT TRANSITION BETWEEN PROCESSOR POWER STATES

PRIORITY

This application claims priority to India Patent Application No. 3082/DEL/2010, filed Dec. 23, 2010.

BACKGROUND

1. Technical Field

Embodiments generally relate to techniques for power management in a computer platform. More particularly, certain embodiments provide a method for saving or retrieving state of a processor in support of transitioning a computer platform between processor power states.

2. Background Art

Improvements in integrated circuit (IC) fabrication and in other aspects of computer device manufacturing have allowed for smaller and/or more densely integrated platform architectures. The circuitry in such platforms is generally trending toward increasing sensitivities to inefficiencies in power use and/or increasing sensitivities to inefficient use of die space. Consequently, incremental improvements in power efficiency, die size and/or die utilization provide increasingly large performance gains in such platforms. This is particularly so in the case of small form factor platforms such as those of handheld devices—e.g. smart phones, tablets and the like.

Existing computer platforms variously include one or more features for managing the distribution of power to, or use of power by, processors of such platforms. For example, such features may variously implement a processor idle state, for example, in response to a user initiated platform suspend, or hibernate, request. To support a processor idle power state such as the C6 power state, a platform must assure that state information of the processor is not lost during a period of time when the processor is in that processor idle power state. In existing technologies, processors variously include dedicated hardware for either offloading processor state to differently-powered areas on-chip or for continuously maintaining processor state in a specialized power domain which is separate from another, general power domain of the processor.

Reliance on such techniques for implementing a processor idle power state has imposed a requirement that various implementing circuitry—e.g. one or more of registers, power distribution traces, control logic, etc.—be included on the processor's IC chip. Such requirements have up to now imposed certain its on efforts to reduce, and/or to improve the utilization of, the die space of processors.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
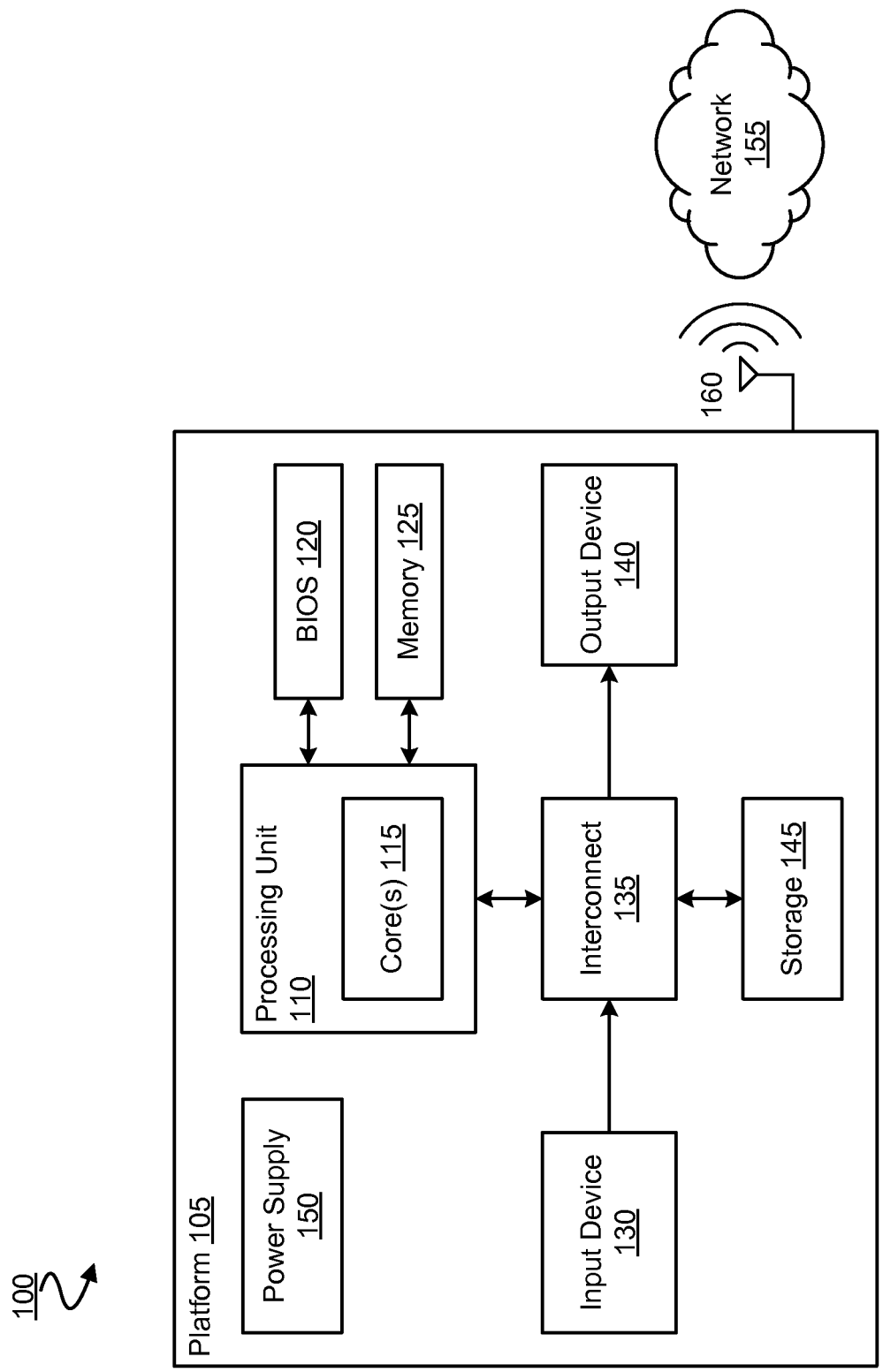
FIG. 1 is a block diagram illustrating select elements of a system according to an embodiment for providing access to processor state information.

Embodiments variously provide access to processor state for the purpose of transitioning a processor between processor power states. Various embodiments may be implemented on a computer platform configured to execute an operating system (OS)—for example, with a processor and a memory of the platform. The processor of the platform may lack dedicated circuitry capable of independently maintaining some or all processor state for later retrieval and/or use—e.g. for when the processor returns from the processor idle to a higher power, operative processor state. However, various embodiments are not limited in this regard.

"Processor state information", or simply "processor state", refers to information describing a status of processing by one or more processors at a particular time—e.g. data cached or otherwise stored by the processor, a current (or next) instruction to be executed, a condition of a stack, parameters to determine exception handling, error handling, etc. or information that otherwise determines how processing is being performed and/or is to be performed by the processor at a particular point. Providing access to processor state may include, for example, providing processor state for storage outside of the processor, e.g. in preparation for the processor transitioning to a processor idle state. Alternatively or in addition, providing access to processor state may include making the processor state available for loading into the processor, e.g. in preparation for transitioning from a processor idle state to a higher power operative processor state.

In certain embodiments, an OS may initiate a transition to (or from) a processor idle power state. By way of illustration and not limitation, in response to detecting an opportunity to transition a processor between processor power states, an OS which is executing on that processor may trigger the processor to perform a task switch. In certain embodiments, the task switch may save some or all state of the processor to a task switch repository—e.g. a data structure in memory which is otherwise available to the OS for general-purpose task switches during normal runtime execution of the OS. Although certain embodiments are not limited in this regard, a location of the task switch repository in memory, an arrangement of data in the task switch repository and/or a referencing to the task switch repository by other platform data may be compatible with use by x86 architectures of Intel Corporation, Santa Clara, Calif.

For example, the task switch repository may include a task state segment (TSS). By way of illustration and not limitation, a task switch may save to the TSS one or more of segment register state, control register state, EFLAG register state, EIP register state and segment selector state. Although features of certain embodiments are described herein in terms of accessing a TSS, it is understood that such features may be extended to apply in other embodiments to accessing any of a variety of additional or alternative task switch repositories.

In an embodiment, the task switch may include switching the processor away from executing a task of an application which is running on the OS. In such cases, the task switch may, for example, be performed without the application receiving any indication of a need to freeze an operation for the power state transition.

Alternatively or in addition, the OS initiating a task switch for a processor power state transition may, for example, include switching the processor in question from executing a task in an OS context to executing a power management task in another context. For example, the processor may switch to a task for a context other than a context of the OS. By way of illustration and not limitation, the task switch may include switching the processor to executing a single-threaded context, or other context, for executing a power management task which is not any task of the OS. Such a power management task may, for example, include a. Basic Input/Output System (BIOS) or other firmware task.

FIG. 1 illustrates select elements of a system 100 according to certain exemplary embodiments. System 100 may include a platform 105 having a power supply 150 for variously providing power to other components of platform 105. Although the scope of the various embodiments is not limited in this respect, platform 105 may include one or more of a personal computer (PC), a personal digital assistant (PDA), an Internet appliance, a cellular telephone, a laptop computer, a tablet device, a mobile unit, a wireless communication device and/or any other computing device.

According to certain embodiments, platform 105 may include a processing unit 110 directly or indirectly coupled to one or more other components—e.g. a memory 125 and a system interconnect 135. Additionally or alternatively, processing unit 110 may have access to Basic Input/Output System (BIOS) instructions—e.g. stored in memory 125 or in a separate storage device (120). For example, the processing unit 110 may be variously coupled to components of platform 105 via one or more address and/or data busses. It should be understood that interconnects other than or in addition to such busses may be used to connect processing unit 110. For example, one or more dedicated lines, crossbars, etc, may be used to connect processing unit 110 to memory 125.

As discussed below, processing unit 110 may include one or more cores 115 to execute an operating system (OS), not shown. In various embodiments, the executing OS may implement one or more features e.g. an Advanced Configuration and Power Interface (ACPI) and/or operating system power management (OSPM) code—to provide management of power distribution and/or consumption on platform 105.

In addition, processing unit 110 may include a cache memory (not shown), such as, for example, static random access memory (SRAM) and the like, or any of a variety of types of internal integrated memory. Memory 125 may include a dynamic random access memory (DRAM), a non-volatile memory, or the like. In one example, memory 125 may store a software program which may be executed by processing unit 110.

Interconnect 135 may interconnect various components of platform 105 for various exchanges of data and/or control messages way of illustration and not limitation, interconnect 135 may include one or more of an Ethernet interface, a Universal Serial Bus (USB) interface, a Peripheral Component Interconnect interface, and the like. Additionally or alternatively, interconnect 135 may include circuitry to control various components interconnected thereby. For example, interconnect 135 may include one or more controller hubs such as an I/O controller hub, a platform controller hub, a memory controller hub, and/or the like.

In order to illustrate various features of certain embodiments, interconnect 135 is shown coupling processing unit 110 to an input device 130 for receiving communications at platform 105, an output device 140 for sending communications from platform 140 and a storage 145 for storing data in platform 105. By way of illustration and not limitation, either or both of input device 130 and output device 140 may include one or more of a keyboard, keypad, mouse, touch screen, display, biometric device, and the like. Storage device 145 may include one or more of a hard disk drives (HDD), solid state drive (SSD), compact disk (CD) drive, digital versatile disk drives (DVD), and/or other computer media input/output (I/O) devices. In an embodiment, one or more of input device 130, output device 140 and storage device 145 may be external, and coupled, to platform 105—e.g. as various devices peripheral to platform 105.

It is understood that any of a variety of additional or alternative devices, circuit blocks, etc, of platform 105 may be coupled to processing unit 110, according to various embodiments. It is also understood that the particular architecture of platform 105—e.g. the relative configuration of devices, circuit blocks, etc. of platform 105 with respect to processing unit 110—is not limiting on certain embodiments.

According to certain embodiment, system 100 may exchange data with other devices via a connection to a network 155—e.g. using a network interface card, wireless network interface, or antenna 160 of platform 105. The network connection may include any type of network connection, such as an Ethernet connection, a digital subscriber line (DSL), a telephone line, a coaxial cable, etc. Network 155 may be any type of network, such as the Internet, a telephone network, a cable network, a wireless network such as, for example, a network complying with IEEE standard 802.11, 1999, one or more IEEE 802.11 related standards, the IEEE 802.16 Standard for Wireless Metropolitan Area Networks and/or the like.

According to one embodiment, processing unit 110—e.g. a particular processing core of the one or more cores 115—may variously operate in two or more processor power states. As used here, power state refers to one or more characteristics e.g. voltage level, current level, clock frequency, etc.—of power being delivered to, and/or used by, a device or combination of devices which are in that power state. Platform 105 may provide hardware and/or executing software to support, initiate, or otherwise implement transitions of the processor core between such processor power states.

Figure 2:
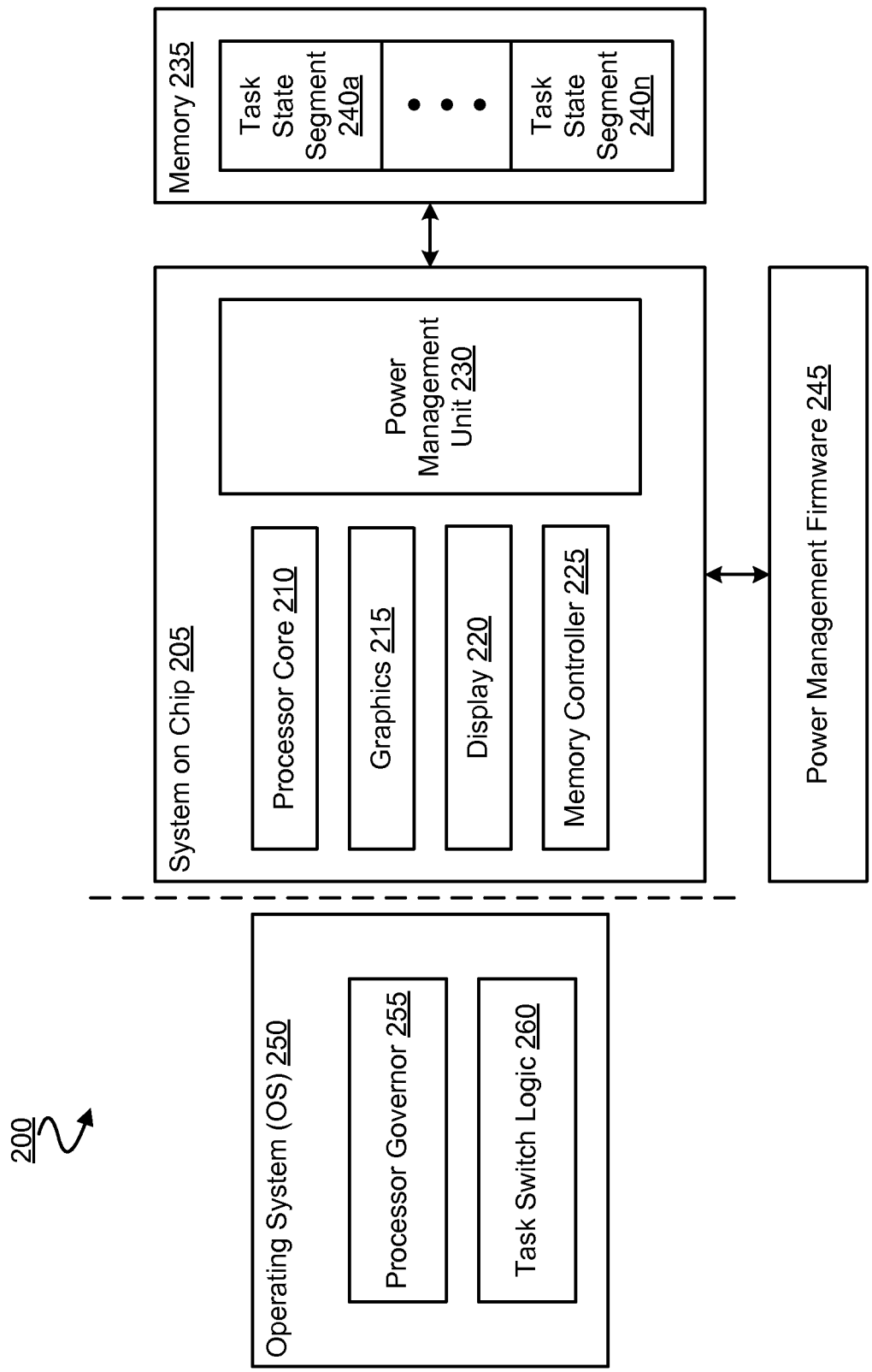
FIG. 2 is a block diagram illustrating select elements of an executing operating system and hardware of a system for providing access to processor state information according to an embodiment.

FIG. 2 illustrates select elements of a platform 200 for providing access to processor state information according to an embodiment. Platform 200 may include some or all of the features of platform 105, for example.

By way of illustration and not limitation, platform 200 may include a processor core 205 to execute an operating system (OS) 250. For purposes of illustrating certain features of one embodiment, processor core 210 is shown as residing on a system-on-chip (SoC) 205 of platform 200. It is understood that processor core 210 may, in an alternate embodiment, reside outside of one or any SoC of a platform—e.g. in an isolated single-core or multi-core CPU IC chip.

Processor core 210 may be variously coupled to one or more other components of platform 200—e.g. including components which reside on, or off of, SoC 205. By way of illustration and not limitation, SoC 205 my include a graphics module 215 having circuitry or other logic to perform rendering calculations or other processing of graphics data. Alternatively or in addition, SoC 205 may include a display module 220 having interface, driver or other circuitry/logic for providing video information to a display. Alternatively or in addition, SoC 205 may include a memory controller 225 including circuitry or other logic to manage access to data storage components of platform 200. Alternatively or in addition, SoC 205 may include a power management unit (PMU) 230 to variously detect, determine or otherwise provide data and/or control messages associated with power management for one or more components of platform 200.

In various embodiments, some or all of the components of platform 200 coupled to processor core 210 may, in various alternate embodiments, reside separate from one or any SoC of platform 200. Also, it is understood that the combination and/or configuration of such other coupled components of platform 200 is merely illustrative, and that platform 200 may, according to different embodiments, include any of a variety of combinations of one or more additional or alternative components coupled to processor core 210.

OS 250 may exhibit baseline runtime execution during one or more operative i.e. non-idle—processor power states of processor core 210. During such normal runtime execution, OS 250 may perform various tasks. When processor core 210 is executing instructions of OS 250, e.g. by performing tasks on behalf of OS 250, processor core 210 may be said to be operating in a context of OS 250. Tasks performed in the context of OS 250 may include, but are not limited to, a task for performing operations of an application running on OS 250, a task for OS 250 to implement interrupt handling, a task for OS 250 to implement exception handling, and the like.

During such runtime execution, OS 250 may variously switch between such tasks while remaining in an operative processor power state. For example, OS 250 may invoke a task switch call to save information in processor core 210 which describes a state of execution of a currently executing task, and to load into processor core 210 other information describing a state of execution of a next task to be switched to—e.g. a task to either begin or resume execution. By way of illustration and not limitation, OS 250 may signal one or more task switches cause processor core 210 to variously save and/or load task state for respective tasks by accessing, respectively, a corresponding one of Task State Segments (TSSs) 240a, . . . , 240n of a memory 235.

In an embodiment, OS 250 may include a processor governor 255—e.g. functionality from a set of executing instructions which operate to evaluate or otherwise detect one or more processor idleness conditions of processor core 210. In an embodiment, processor governor 255 may include a CRADLE governor routine of a Linux OS. Alternatively or in addition, processor governor 255 may include one or more processor idle/load detection functional available using OS power management (OSPM) agents such as those available in the Advanced Configuration and Power Interface (ACPI) open standard—such as ACPI Revision 4.0a, released Apr. 5, 2010. Although described herein in terms of a processor governor 255, it is understood that the OS 250 may include or otherwise provide any of a variety of additional or alternative detecting logic to detect an processor idle condition, according to various embodiments.

By way of illustration and not limitation, processor governor 255 may execute to determine, receive an indication of, or otherwise detect a level or type of current processor idleness, current rate of change of processor idleness, expected future processor idleness, expected future rate of change of processor idleness, and/or the like. It is understood that detecting an idle state of processor core 210 may include detecting a corresponding load state of processor core 210.

For example, OS 250 may include or otherwise have access to a scheduler (not shown) which looks to schedule a next operation, thread, etc. for OS 250. Processor governor 255 may detect that the scheduler for OS 250 has determined that there is, or is expected to be, no ready operation or thread to schedule for OS 250 to execute.

Based on a detecting of a current or expected future processor idle condition, processor governor 255 may determine that the idle condition represents an opportunity to transition processor core 210 to a processor idle state e.g. a C6 (or lower) power state. In response to identifying such an opportunity, processor governor 255 may initiate such a power state transition. In an embodiment, initiating the power state transition may include processor governor 255 performing a call to task switch logic 260 of OS 250. In turn, task switch logic 260 may provide a low-level signal for hardware of processor core 210 to perform a task switch. In an embodiment, the task switch saves a state of processor core 210 to a TSS—e.g. one of the ISSs 240a, . . . , 240n of memory 235 which are available for task switches when OS 250 is to remain in an operative power state or states.

For example, processor core 210 may switch to a task for a context other than a context of OS 250. By way of illustration and not limitation, the task switch may include switching the processor to executing a single-threaded context, or other context, for executing a power management task which is not any task of OS 250. Such a power management task may, for example, include a task of power management firmware 245—a Basic Input/Output System (BIOS) task.

Figure 3:
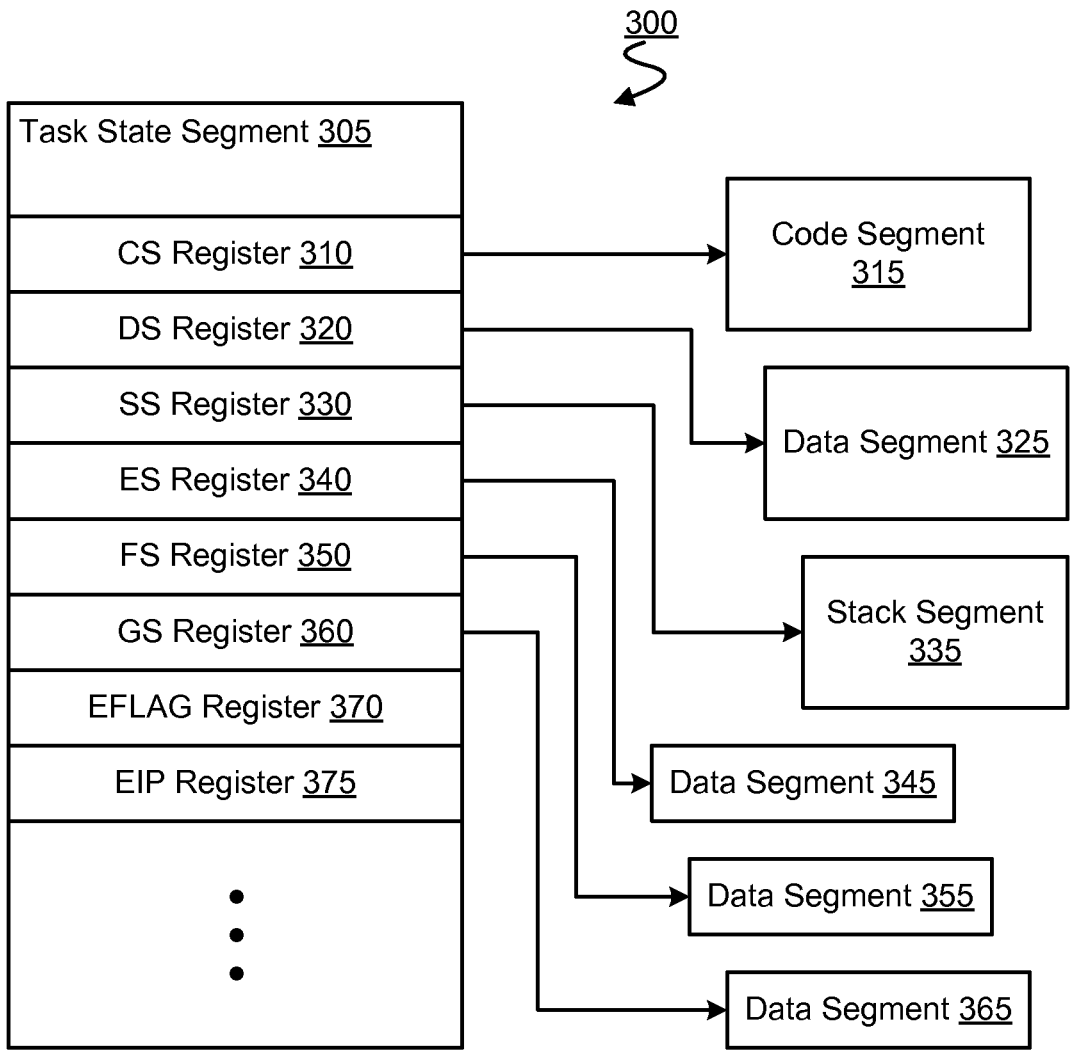
FIG. 3 is a block diagram illustrating select elements of a task state segment for storing processor state information according to an embodiment.

FIG. 3 illustrates select elements of processor state 300 which, according to an embodiment, provided to (or from) a TSS 305, where providing is for a task switch that is in support of a processor power state transition. TSS 305 may include some or all of the features of TSS 240a, for example.

In an embodiment, ISS 305 may further be available for another providing—e.g. storing or offloading—of processor state, where the other providing is for a task switch, wherein throughout the task switch, the processor in question is to remain in the same operative processor power state.

The availability of TSS 305 for either or both types of task switches—i.e. for processor power state transitions or for an unchanging, operative processor power state—may, for example, result from a location of TSS 305 in a memory and/or an arrangement of processor state information within TSS 305. Alternatively or in addition, the availability of TSS 305 for both types of task switches may result from a register, table, pointer, or other platform data element (not shown) which is external to, and references, TSS 305—e.g. indicating that TSS 305 is a type of processor state repository which is available for access to implement generic task switches during normal runtime execution of an OS.

By way of illustration and not limitation, the location of, arrangement of and/or referencing to TSS 305 in a platform may be compatible with use of TSS 305 with x86 architectures of Intel Corporation, Santa Clara, Calif. More particularly, TSS 305 may include one or more of a CS register 310 to store a selector of a code segment 315, a DS register 320 to store a selector of a data segment 325, and a SS register 330 to store a selector of a stack segment 335.

The selectors CS register 310, DS register 320 and SS register 330 may be readily loaded into, or unloaded from, a processor with a task switch e.g. for restoring or preserving, respectively, a current state of task execution at the point of implementing a task switch.

TSS 305 may include various alternate or additional structures which, for example, are compatible with implementation of task switching by x86 architecture processors. By way of illustration and not limitation, TSS 305 may include one or more additional data segment registers—represented illustratively as ES register 340, FS register 350, and GS register 360 which may store respective selectors for additional data segments 345, 355, 365. Alternatively or in addition, TSS 305 may store an EFLAG register 370 to store various flags indicating modes of processor operation (e.g. single-step mode, interrupt handling modes, task chaining mode, etc.) for performing the task associated with TSS 305. Alternatively or in addition, TSS 305 may store an LIP register 375 to store a pointer to a current instruction for execution of the task. Techniques to store and/or retrieve processor state by accessing a TSS with x86 architecture processors are well documented, and not limiting on various embodiments, which extend these and other such techniques for application in task switches in support of processor power state transitions.

It is understood that the structures shown in TSS 305 are merely illustrative, and that TSS 305 may include any of a variety of additional or alternative structures and/or information to store processor state. Moreover, such structures and/or information may indicate an availability of TSS 305 to a processor for accessing to implement either one of a task switch associated with a power state transition by the processor—e.g. to or from an idle processor power state—and a task switch for when processor is to remain in a single operative power state.

Figure 4:
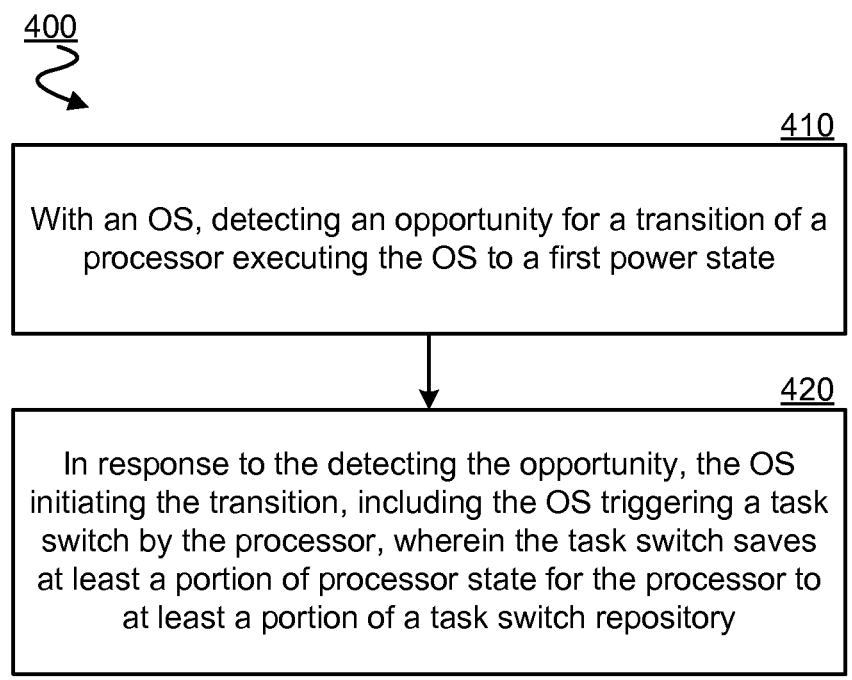
FIG. 4 is a flow diagram illustrating select elements of an algorithm for providing access to processor state information according to an embodiment.

FIG. 4 illustrates select elements of a method 400 for providing processor state according to an embodiment. Method 400 may be performed by hardware of platform 105 executing an OS, for example. In an embodiment, method 400 may include an OS detecting, at 410, an opportunity for a transition of a processor executing the OS to a first power state. For example, the OS may determine that a processor idle condition indicates that power savings are available by putting the processor into an idle processor power state.

In response to the detecting the opportunity, the OS may, at 420, initiate the power state transition. In an embodiment, the OS initiating the transition may include the OS triggering a task switch by the processor. The triggered task switch may save at least a portion of processor state for the processor to at least a portion of a task switch repository of the platform. In an embodiment. One or more features of data in the platform—e.g. an arrangement of data in the task switch repository, a location of the task switch repository in the platform, data external to and referencing the task switch repository—may indicate an availability of the task switch repository for access to implement either one of a task switch associated with a processor's power state transition—e.g. to or from an idle processor power state—and a task switch for when the processor is to remain in a single operative power state.

Techniques and architectures for providing access to processor state are described herein. In the description herein, for purposes of explanation, numerous specific details are set forth in order to provide a thorough understanding of certain embodiments. It will be apparent, however, to one skilled in the art that certain embodiments can be practiced without these specific details in other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), erasable programmable read-only memories (EPROMs), electrically EPROMs (EEPROMs), magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A method comprising:
   with an operating system (OS), detecting an opportunity for a transition of a processor executing the OS to a first power state; and
   in response to detection of the opportunity, the OS initiating the transition, including the OS triggering a task switch by the processor, the task switch to save at least a portion of processor state for the processor to at least a portion of a task switch repository, wherein the task switch includes switching the processor from executing a task in an OS context to executing a power management task in another context, wherein the task switch repository is available to be accessed for another task switch which is not in support of a power state transition by the processor.

2. The method of claim 1, wherein the first power state includes a processor idle state.

3. The method of claim 1, wherein the other context is a single-threaded context.

4. The method of claim 1, wherein executing the power management task includes executing firmware.

5. The method of claim 4, wherein executing the power management task includes executing Basic Input/Output System (BIOS) code.

6. The method of claim 1, wherein the task switch includes switching the processor from executing a task of an application running on the OS, wherein the task switch is performed without indicating to the application any need to freeze an operation for the transition.

7. The method of claim 1, wherein the task switch to save the at least a portion of processor state for the processor includes the task switch to save to the task switch repository one or more of segment register state, control register state, EFLAG register state, EIP register state and segment selector state.

8. An apparatus comprising:
a memory; and
a processor coupled to the memory, the processor to execute an operating system (OS) to detect an opportunity for a transition of the processor to a first power state, and in response to detection of the opportunity, to initiate the transition, including the OS to trigger a task switch by the processor, the task switch to save at least a portion of processor state for the processor to at least a portion of a task switch repository, wherein the task switch includes the OS to switch the processor from execution of a task in an OS context to execution of a power management task in another context, wherein the task switch repository is available to be accessed for another task switch which is not in support of a power state transition by the processor.

9. The apparatus of claim 8, wherein a processor governor of the OS is to detect the opportunity for the transition.

10. The apparatus of claim 8, wherein the first power state includes a processor idle state.

11. The apparatus of claim 8, wherein the other context is a single-threaded context.

12. The apparatus of claim 8, wherein execution of the power management task includes execution of firmware.

13. The apparatus of claim 8, wherein the task switch includes the OS to switch the processor from execution of a task of an application run on the OS, wherein the task switch is performed without an indication to the application of any need to freeze an operation for the transition.

14. The apparatus of claim 8, wherein the task switch to save the at least a portion of processor state for the processor includes the task switch to save to the task switch repository one or more of segment register state, control register state, EFLAG register state, EIP register state and segment selector state.

15. A computer readable storage medium comprising instructions stored thereon which, when executed by one or more processors, perform:
with an operating system (OS), detecting an opportunity for a transition of a processor executing the OS to a first power state; and
in response to detection of the opportunity, the OS initiating the transition, including the OS triggering a task switch by the processor, the task switch to save at least a portion of processor state for the processor to at least a portion of a task switch repository, wherein the task switch includes switching the processor from executing a task in an OS context to executing a power management task in another context, wherein the task switch repository is available to be accessed for another task switch which is not in support of a power state transition by the processor.

16. The computer readable storage medium of claim 15, wherein the first power state includes a processor idle state.

17. The computer readable storage medium of claim 15, wherein the other context is a single-threaded context.

18. The computer readable storage medium of claim 15, wherein executing the power management task includes executing firmware.

19. The computer readable storage medium of claim 18, wherein executing the power management task includes executing Basic Input/Output System (BIOS) code.

20. The computer readable storage medium of claim 15, wherein the task switch includes switching the processor from executing a task of an application running on the OS, wherein the task switch is performed without indicating to the application any need to freeze an operation for the transition.

21. The computer readable storage medium of claim 15, wherein the task switch to save the at least a portion of processor state for the processor includes the task switch to save to the task switch repository one or more of segment register state, control register state, EFLAG register state, EIP register state and segment selector state.

22. A system comprising:
a memory;
a processor coupled to the memory, the processor to execute an operating system (OS) to detect an opportunity for a transition of the processor to a first power state, and in response to detection of the opportunity, to initiate the transition, including the OS to trigger a task switch by the processor, the task switch to save at least a portion of processor state for the processor to at least a portion of a task switch repository, wherein the task switch is to switch the processor from execution of a task in an OS context to execution of a power management task in another context, wherein the task switch repository is available to be accessed for another task switch which is not in support of a power state transition by the processor; and
an antenna coupled to the processor, the antenna to couple the system to a wireless network.

23. The system of claim 22, wherein a processor governor of the OS is to detect the opportunity for the transition.

24. The system of claim 22, wherein the first power state includes a processor idle state.

25. The system of claim 22, wherein execution of the power management task includes execution of firmware.

26. The system of claim 22, wherein the task switch to save the at least a portion of processor state for the processor includes the task switch to save to the task switch repository one or more of segment register state, control register state, EFLAG register state, EIP register state and segment selector state.

* * * * *